United States Patent [19]

Kessel et al.

[11] Patent Number: 5,460,863
[45] Date of Patent: * Oct. 24, 1995

[54] COMPOSITE STRUCTURES

[75] Inventors: Carl R. Kessel, St. Paul; Robert G. Lockwood, Mendota Heights; Tracy R. Woodward, Cottage Grove; Maan-shii S. Wu, Mendota Heights, all of Minn.

[73] Assignee: Minnesota Mining and Manufacturing Company, St. Paul, Minn.

[*] Notice: The portion of the term of this patent subsequent to Apr. 1, 2009 has been disclaimed.

[21] Appl. No.: 300,364

[22] Filed: Sep. 2, 1994

Related U.S. Application Data

[63] Continuation of Ser. No. 188,643, Jan. 26, 1994, abandoned, which is a continuation of Ser. No. 70,261, Jun. 2, 1993, abandoned.

[51] Int. Cl.$^6$ ............................... B32B 7/06; B32B 7/12
[52] U.S. Cl. .......................... 428/40; 428/352; 428/447; 428/906
[58] Field of Search ............................. 428/40, 352, 447, 428/906; 528/27; 549/215; 427/208.4

[56] References Cited

U.S. PATENT DOCUMENTS

| | | | |
|---|---|---|---|
| 4,279,719 | 7/1981 | Hitzler et al. | 428/40 |
| 4,313,988 | 2/1982 | Koshar et al. | 204/159.23 |
| 4,594,277 | 6/1986 | Galli et al. | 428/40 |
| 4,699,816 | 10/1987 | Galli | 428/447 |
| 4,822,687 | 4/1989 | Kessel et al. | 428/40 |
| 5,332,797 | 7/1994 | Kessel et al. | 528/77 |

FOREIGN PATENT DOCUMENTS

| | | |
|---|---|---|
| 0464706 | 1/1992 | European Pat. Off. . |
| 0573044 | 12/1993 | European Pat. Off. . |
| 8223156 | 9/1982 | Italy . |

*Primary Examiner*—Alexander S. Thomas
*Attorney, Agent, or Firm*—Gary L. Griswold; Walter N. Kirn; Robert W. Sprague

[57] ABSTRACT

A composite structure comprising i) a release liner comprising a release composition; and ii) a pressure-sensitive adhesive coated backing wherein the pressure-sensitive adhesive has a relatively high storage modulus. The composite structure exhibits a low unwind noise as a result of the release composition employed.

10 Claims, No Drawings

COMPOSITE STRUCTURES

This is a continuation of application No. 08/188,643 filed Jan. 26, 1994, now abandoned, which is a continuation of U.S. Ser. No. 08/070,261, filed Jun. 2, 1993, now abandoned.

FIELD OF THE INVENTION

This invention relates to an epoxypolysiloxane release composition, and to a pressure sensitive adhesive tape made with the composition having a low noise unwind.

BACKGROUND

Pressure sensitive adhesive tapes are used for a variety of applications from household tapes that are dispensed from a disposable hand held dispenser to carton sealing tapes that are used at a very high volume and are applied rapidly by semiautomatic and automatic taping heads. One of the problems encountered in automatic taping, especially when the tape has a relatively stiff adhesive, is that unwinding the tape from the roll rapidly results in an unacceptably high level of noise which causes discomfort and potential hearing damage to the workers in the taping area. One solution is to supply ear plugs to the workers but the plugs are inconvenient to use and may not always be used.

Solutions to the problem, wherein the product construction is changed, have been suggested by others. U.S. Pat. No. 4,699,816 describes the addition of mineral oil or a synthetic alkylbenzene oil to the adhesive, as well as modifying the backing and the treatment on the backside of the tape. The patent recognizes that there is a noise problem with polyolefin backings, and that a polypropylene backing is particularly noisy when unwound rapidly.

Also, tapes have been made having a pressure sensitive adhesive made with a slight amount of an organic solvent so that the softer adhesive will release from the backsize at a lower noise level. This solution is not desirable because of the use of organic solvents.

In both of the above mentioned cases, the adhesive properties can be undesirably affected. Tapes having softer pressure sensitive adhesives tend to unwind with lower noise levels, but the shear strength of the adhesive is generally lower. Softer adhesives can also exhibit cohesive failure as the tape is unwound, leaving adhesive residue on the backside of the tape.

Tapes with polyvinylchloride (PVC) backings are available which have a low noise unwind. However, the unwind force is generally very high and the tapes cannot be unwound rapidly.

Italian Patent Application No. 21842/A2 describes a method to increase the critical surface tension of the backside of a pressure sensitive adhesive coated tape to a level higher than 33 dynes/cm to reduce the noise level.

Italian Patent Application No. 8223156 (Galli), filed Sep. 2, 1982, describes the modification of release coatings through inclusion of a fluorinated compound, a reactive silicone compound, a silicone compound modified with a polyamidic resin, a halogenated polyolefinic resin, or other compound or resin.

Release coatings are known and a number of them are commercially available. Silicone release coatings typically have a very low unwind force, and generally have a low noise at unwind with most types of pressure sensitive adhesives. However, in a roll of tape, the low unwind force can also cause the pressure sensitive adhesive to release or slide from the backside of the underlying lap causing the roll of tape to telescope. It is also difficult to provide a controlled unwind force with silicone coatings.

EP 464706 describes an ultraviolet-curable silicone composition having an epoxy-functional polyorganosiloxane and a copolymer for regulating peel strength that is soluble in the polyorganosiloxane. The copolymer is selected from MQ, MT, or MDQ copolymers.

Epoxypolysiloxanes have been found to provide useful release compositions as described in, for example, U.S. Pat. Nos. 4,279,719, 4,313,988 and 4,822,687. However, there is no teaching that any of the compositions provide a low noise unwind pressure sensitive adhesive tape having a controlled unwind force.

It would therefore be desirable to have a release composition for pressure sensitive adhesive tapes which could be modified to provide the desired unwind force for a given adhesive, but would unwind readily without excessive noise levels.

SUMMARY OF THE INVENTION

The invention provides a novel composite structure comprising i) a first substrate bearing on a portion of a first major surface thereof a first layer comprising the reaction product of a starting material comprising an epoxypolysiloxane of the formula I:

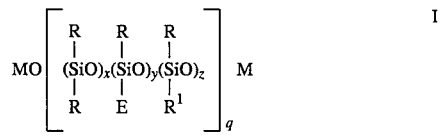

wherein R is a lower alkyl group having one to three carbon atoms;

$R^1$ is branched or cyclic alkyl; aryl; straight, branched or cyclic alkylaryl; or straight, branched or cyclic aralkyl; contains four up to about 50 carbon atoms (preferably six up to about 20 carbon atoms); and may be optionally substituted by one or more functional groups, but is substantially free of any functional group which increases crosslinking of the epoxypolysiloxane through reaction with the epoxy functionality;

E is a monovalent epoxy functional group which can be linear aliphatic, branched aliphatic, cycloaliphatic, or a mixture thereof;

M is a silyl group selected from $R_3Si$—, $R_2R^1Si$—, $RR^1_2Si$—$R^1_3Si$—$R_2ESi$—, $RE_2Si$—, $E_3Si$—$R^1_2ESi$, $R^1E_2Si$—. and $RR^1ESi$—, in which R, $R^1$, and E are defined above;

x is zero or a number having a value up to about 200;

y is zero or a number having a value up to about 40;

z is one or a number having a value up to about 200 −x, and preferably, z is less than x; and q is a number having a value of 1 to about 75; with the proviso that the epoxypolysiloxane contains at least one E group, but less than about 20%, preferably less than about 18%, and most preferably less than about 16% of the total number of siloxane groups in Formula I are substituted with E;

the first layer being cured in the presence of a catalytically effective amount of a cationic curing catalyst; and ii) a second substrate bearing on at least a portion of a major surface thereof a second layer comprising a pressure-sensitive adhesive having a storage modulus when measured in torsional shear at 25° C. and at 100 radians/second of at least about 6×10⁵ dynes/cm², preferably at least about 8×10⁵ dynes/cm², and most preferably at least about 1×10⁶ dynes/cm², the second substrate being attached to the surface of the first layer opposite the first substrate by means of the pressure-sensitive adhesive. The first and second substrates may be different components or, preferably, are the same component such as where the composite structure is in the form of a convolutely wound roll of tape with the tape backing functioning in effect as a release surface as well.

Preferably, the composite structure of the invention is prepared using an epoxypolysiloxane having both linear or branched aliphatic and cycloaliphatic epoxy functionalities as E since this provides the increased cure rates and improved physical properties as is disclosed in copending application U.S. Ser. No. 07/861,647, filed Apr. 1, 1992, and commonly assigned, incorporated hereby reference.

DETAILED DESCRIPTION

The epoxypolysiloxanes employed in the practice of the invention contain groups which are effective at modifying the release levels while maintaining low crosslink densities. By limiting the number of epoxy groups a lower crosslink density can be obtained, and by utilizing certain monovalent organic groups as $R^1$, the release levels can be effectively modified. It is theorized that the combination of low crosslink densities and the appropriate modifiying groups as $R^1$ result in a release coating having a low noise unwind in a pressure sensitive adhesive coated tape while having controlled release levels.

The epoxypolysiloxanes useful in the practice of the invention can be fluids or high molecular weight greases or gums. Fluids having molecular weights of about 1,000 to 20,000 are preferred for ease of handling, particularly in applications where 100% solids coatings are used. Higher molecular weight materials, e.g., 1.5×10⁶ or higher can be used in solution coatings.

The epoxypolysiloxanes employed in the invention can be prepared by methods known in the art such as the chloroplatinic acid catalyzed addition reaction of hydride functional siloxanes with aliphatically unsaturated epoxy compounds, or the epoxidation of vinyl or like unsaturated siloxanes, and Grignard type reactions, as described by E. P. Plueddemann and G. Fanger, *J. Am. Chem Soc.* 81, 2632-35 (1959). A convenient method is the hydrosilation reaction of unsaturated aliphatic epoxy compounds with hydride-functional silicone oligomers. When this method is used, it is preferred that essentially complete reaction of the SiH sites are accomplished although small amounts of hydrogen attached to silicon may be present.

Another method is the hydrosilation reaction of the reactants for the monovalent organic group followed by the hydrosilation reaction of the unsaturated aliphatic epoxy compounds with hydride-functional silicone oligomers. The afore-mentioned hydrosilation reactions may also be carried out concurrently.

The various siloxane units, whether substituted by R, $R^1$, or E in Formula I, may be ordered or randomly arranged in the epoxypolysiloxane.

Representative examples of non-cyclic unsaturated aliphatic epoxy compounds that can be used in the preparation of the epoxypolysiloxanes include the following:

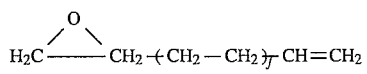

in which f is 1 to 30; 3,4-epoxybutene; 4,5-epoxy-1-pentene; 5,6-epoxy-1-hexene; 3,4-epoxy-3-methyl-1-butene; 3,4-epoxy-2,3-dimethyl-1-butene; allyl glycidyl ether; and

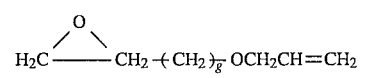

in which g is 1 to 20.

Representative examples of cycloaliphatic epoxy compounds that can be used in the preparation of the epoxypolysiloxanes include 4-vinyl cyclohexane oxide; limonene monoxide; vinylnorborenemonoxide; and dicyclopentadienemonoxide.

Representative $R^1$ groups in the above Formula I include aryl groups such as phenyl, naphthyl, and bisphenyl; alkylaryl groups such as tolyl and xylyl; aralkyl groups such as phenylmethyl, phenylethyl, phenylpropyl, phenylhexyl, 3-phenoxypropyl, and 3-phenylpropyl; cycloaliphatic groups such as cyclopentyl and cyclohexyl; and 10-carboethoxydecyl. $R^1$ should be free of functional groups such as epoxy, hydroxy, or vinyl ether groups which may lead to an increase in crosslink density, and $R^1$ is preferably free of polyethylene oxide groups which may reduce cure rates. Preferred $R^1$ groups are hydrocarbons having no functional groups. The most preferred $R^1$ groups are hydrocarbons comprising a phenyl substituent.

Preferred hydride-functional silicone oligomers for use in the preparation of the epoxypolysiloxanes are the hydride functional silicone oligomers having the general formula IV

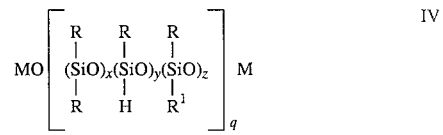

wherein R, ¹, x, y, z, and q are the same as defined in Formula I, and

M is a silyl group selected from $R_3Si-$, $R_2R^1Si-$, $RR^1{}_2Si-$, $R_2HSI-$, $RH_2Si-$, $H_3-$, $R^1H_2Si-$, $R^1{}_2HSi-$, $RR^1HSi-$, and $R^1{}_3Si$, in which R and $R^1$ are defined above.

The hydrosiloxanes are well known and are generally prepared, for example, by the equilibration of a mixture of polyhydromethylsiloxane (available from Dow Corning as DC™1107) and octamethylcyclotetrasiloxane (commonly designated $D^4$ and available from Dow Corning) with up to 20% of other alkylpolysiloxanes, and hexamethyldisiloxane or other hexalkyldisiloxanes, in the presence of a strong mineral acid. By varying the ratios and nature of the siloxanes in the mixture, the range of hydrosiloxanes within the definition of Formula IV can be prepared.

As indicated above, preferred epoxypolysiloxanes of Formula I to be employed in the practice of the invention comprise both linear or branched aliphatic and cycloaliphatic epoxy groups. Preferred epoxypolysiloxanes of Formula I having both aliphatic and cycloaliphatic epoxy groups are of the more specific formula V:

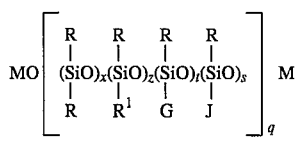

wherein
R is a lower alkyl group having one to three carbon atoms,
$R^1$ is as defined above in the context of Formula I;
J is a monovalent linear or branched aliphatic epoxy group;
G is a monovalent cycloaliphatic epoxy group;
M is a silyl group selected from $R_3Si—$, $R_2R^1Si—$, $RR^1_2Si—$, —, $R^1_3Si—$, $R_2JSi—$, $RJSi—$, $J_3Si—$, $R^1_2Si—$, $R^1J_2Si—$, $RR^1JSi—$, $R_2GSi—$, $RGSi—$, $G_3Si—$, $R^1_2GSi—$, $R^1_{G2}Si$, $RR^1GSi—$, $RJGSi—$, $J_2GSi—$, $G_2JSi—$, and $R^1JGSi—$, in which R, $R^1$, J and G are defined above;
x is zero or a number having a value of up to about 200;
z is a number having a value of 1 to about 200–x;
s is zero or a number having a value of up to about 40;
t is zero or a number having a value of up to about 40; and
q is a number having a value of 1 to about 75; with the proviso that said epoxypolysiloxane comprises at least one G group and one J group, the ratio of G to J groups is from about 1:10 to 2:1, and the total number of J and G groups is less than about 20% of the total number of siloxane units.

Curing of the epoxypolysiloxane-containing compositions employed in this invention can be effected by mixing the compositions with conventional cationic epoxy curing catalysts that are activated by actinic radiation and/or heat. Catalysts activated by actinic radiation, also called photoinitiators, are preferred. Examples of suitable photoinitiators are onium salts of a complex halogen acid, particularly the polyaromatic iodonium and sulfonium complex salts having $SbF_6$, $SbF_5OH$, $PF_6$, $BF_4$, or $AsF_6$ anions, as are disclosed in U.S. Pat. No. 4,101,513 (Fox, et al), incorporated herein by reference. Preferred photoinitiators are the iodonium and sulfonium complex salts, most preferably having the $SbF_6$ anion. Also useful photoinitiators are the organometallic complex salts which are disclosed in U.S. Pat. No. 5,089,536 (Palazzotto), and supported photoinitiators for the actinic radiation activated polymerization of cationically-polymerizable compounds described in U.S. Pat. No. 4,677,137 (Bany, et al), both of which are incorporated herein by reference. The amount of photoinitiator useful to provide release coatings can range from about 0.2 to 5 percent by weight of the total weight of the epoxypolysiloxane(s). A supported photoinitiator, which may contain 0.005 to 5 parts by weight of onium salt photoinitiator per part of support material, can be used in an amount of from about 0.005 to 50 parts, preferably 1.0 to 10 parts per 100 parts of total epoxypolysiloxane(s).

Suitable ultraviolet radiation for curing coatings of the controllable release composition can be obtained from both high and medium pressure mercury vapor lamps, black light lamps, and the like. Exposure necessary to effect the cure depends upon the concentration of the photoinitiator, the particular epoxypolysiloxane(s) used, the thickness of the coated composition, and the wavelength of the ultraviolet radiation. Wavelengths of 200 to 400 nm are preferred although wavelengths up to 600 nm can be used by including select spectral sensitizers. Generally, the exposure time ranges from about 0.1 second or less to about 10 minutes. Useful sensitizers include 2-isopropylthioxanthone, 1,3-diphenyl-2-pyrazoline, and 1,3-diphenylisobenzofuran. Other useful sensitizers are disclosed in U.S. Pat. No. 4,250,053 (Smith). incorporated herein by reference. Effective amounts of spectral sensitizer can be in the range of 0.01 to 10 parts, preferably about 0.05 parts to 1.0 parts per part of photoinitiator.

Suitable heat-activated cationic catalysts which may be used include the heat-activated sulfonic and sulfonylic catalysts described in U.S. Pat. No. 4,313,988 (Koshar, et al), incorporated herein by reference.

Heat activated cationic catalysts will generally be used in an amount of about 1 to 5 parts by weight per 100 parts of the total epoxypolysiloxane(s).

In the practice of the invention, the epoxypolysiloxane and the catalyst are mixed and, when needed to provide a viscosity suitable for coating, an organic solvent may be added. Solvents that can be used include ethyl acetate, isopropyl acetate, acetone, methyl ethyl ketone, heptane, toluene, and mixtures thereof. The composition is then coated onto a substrate and cured. The method of coating is not particularly critical and any of several well known pieces of apparatus may be used. Such apparatus include wire-wound rods, e.g., a Meyer bar, rotogravure applicator rolls, e.g. a roll having 80 lines per cm, a 5- or 6-roll coater or a mixing spray nozzle having separate lines for the epoxypolysiloxane fluid and the catalyst solution.

The coated composition can then be cured by exposing to about 0.05 to about 1.5 joules per square centimeter of actinic radiation. It is sometimes desirable to apply heat during or after the irradiation. The process of irradiation followed by heating is known in the art as two-stage curing.

In cases where the catalyst is heat-activated, the coating generally is heated to temperatures ranging from about 25° C. to about 150° C.

The release compositions can be applied to various substrates including as paper, wood, cardboard, polymeric films, glass, and metals. For a pressure sensitive adhesive tape, the substrate is a flexible material, also called a backing, typically used in making pressure sensitive adhesive tapes. These backings include biaxially oriented polypropylene, cellulose acetate, polyester (such as biaxially oriented polyethylene terephthlate), polyethylene, paper, treated papers, and the like. Biaxially oriented polypropylene is preferred for its low cost and relatively high strength characteristics. The composition is particularly useful in making pressure sensitive adhesive tapes with biaxially oriented polypropylene backings having a low noise unwind.

The release compositions employed in the practice of the invention are particularly useful in combination with adhesives that are sufficiently stiff or have a relatively high storage modulus to be prone to providing a noisy unwind when used with a conventional release composition. Such adhesives can be characterized as those having a storage modulus (G') at 25° C. of greater than about $6 \times 10^5$ dynes/$cm^2$ at 100 radians/second as measured in torsional shear on a Rheometrics RDA II rheometer. The Handbook of Pressure Sensitive Adhesive Technology, 2Ed., D. Satas, Ed. (Van-Nostrand Reinhold, 1989) at pages 171–176, incorporated herein by reference, includes a discussion of storage modulus as it relates to pressure sensitive adhesives.

Examples of pressure sensitive adhesives having the requisite storage modulus include adhesives well known in the art such as block copolymer adhesives and natural rubber adhesives. Many acrylate adhesives also exhibit the requisite storage modulus.

The block copolymer adhesives are typically compounded from an A—B—A block copolymer, a tackifier, and various additives such as stabilizers, antioxidants, etc.

Examples of block copolymers include styrene-isoprene-styrene (SIS), styrene butadiene-styrene (SBS), etc. Commercially available block copolymers include those available under product numbers 1107, 1101, 1111, 1112 and 1117 from Shell Chemical Company under the Kraton™ trademark. Other block copolymers include Vector™4100, available from Dexco Polymers.

The tackifier components can be either solid, liquid, or a blend thereof. Solid tackifiers include rosin, rosin derivatives, hydrocarbon resins, polyterpenes, coumarone indenes, and the like. Liquid tackifiers include liquid hydrocarbon resins, hydrogenated liquid polystyrene resins, liquid polyterpenes, liquid rosin esters, and the like. Commercially available tackifier resins include Wingtack™95 and Wingtack™Plus from The Goodyear Company, and Regalrez™1018 and 1078 from Hercules, Inc.

Natural rubber adhesives are known in the art and typically contain natural rubber, tackifiers, antioxidants and crosslinkers.

Acrylate adhesives include those made as described in Re 24 906 (Ulrich) and U.S. Pat. Nos. 4,833,179 (Young et al.) and 4,952,650 (Young et al.), incorporated herein by reference.

The adhesives can be applied to the backings by conventional methods used in the industry including roll coating of solvent based and emulsion adhesives, hot melt coating by conventional extrusion equipment, transfer roll coating, and the like.

Preferably, the adhesives are hot melt coated to avoid the use of organic solvents or the need for drying large amounts of water from emulsion adhesives. Block copolymer pressure sensitive adhesives are particularly suited for hot melt coating. The adhesives are typically prepared using compounders or twin screw extruders to mix the components. A typical twin screw extruder is described in the Short Course Notes of the Technical Association of the Pulp and Paper Industry, 1981, Hot Melt Coatings, "Liquid Resin Injection System for Continuous Mixing of HMPSA", W. H. Korez. The extruder described includes a port valve for injecting liquid resins.

The tape is typically made by coating the release composition onto a backing, curing the composition, and coating the adhesive composition onto the opposite surface. The processes may be carried out separately or in-line. Prior to either or both coating steps, the backing may be treated to enhance adhesion of the compositions to the backing. Such treatments include chemical priming, flame treatment, and corona treatment.

The objects and advantages of this invention are further illustrated by the following examples, but the particular materials and amounts thereof recited in these examples should not be construed to unduly limit this invention.

TEST PROCEDURES

Unwind Force

This test measures the force required to unwind a roll of pressure sensitive adhesive tape. The test is conducted by mounting a 2.54 cm wide roll of pressure sensitive adhesive tape on a spindle attached to the lower jaw on an Instron tensile tester and pulling the tape off of the roll at a 90° angle at a speed of 30 centimeters/minute. The test results are recorded in Newtons/decimeter (N/dm). Initial (Init) indicates that the sample tapes were conditioned at 20° C. for at least 24 hours, but were not exposed to heat aging.

The unwind force is also measured after heat aging the tape in a forced air oven at 49° C. for 11 days ("Aged" in the tables below). The roll of tape is conditioned at 20° C. for about 24 hours before testing. Results are recorded in N/dm.

Storage Modulus

Storage modulus is an indication of the stiffness of a pressure sensitive adhesive. This test measures, in torsional shear mode, the storage modulus (G') of a pressure sensitive adhesive at 25° C. and 100 radians/second. The tests in the following examples were conducted in the torsion shear mode on a Rheometrics™ Dynamic Analyzer RDA II, manufactured by Rheometrics, Inc. of Piscataway, N.J. The test was performed according to the manufacturer's instructions and the storage modulus is reported as G' in dynes/cm$^2$.

Sound Level

This test measures the noise generated by unwinding a roll of pressure sensitive adhesive tape. The test is conducted in a reverberation chamber with the sensor of a Bruel & Kjaer Type 2232 Sound Meter positioned inside of the chamber. The tape is unwound, fed through a slot in the chamber and wound up on a motor driven spindle outside of the chamber at a distance of 5.3 meters from the unwind spindle. To decrease the error from extraneous noise, the sound meter should read no more than 50 decibels with only the motor running.

A roll of tape is mounted on the spindle inside of the chamber and is unwound with the adhesive side of the tape facing the sound meter sensor. The tape is unwound at a surface speed of 21.3 meters per minute. Five readings are recorded at five second intervals and the average noise level is recorded in decibels (dB). It is preferred to have decibel readings of less than about 90, and more preferably, less than 80 dB.

Release Composition ("Comp") R1

An epoxysilicone (ES) of the following general formula

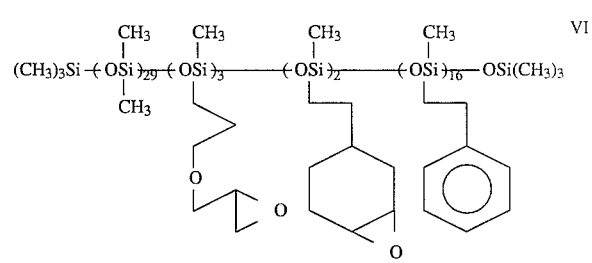

was prepared in the following manner.

A hydride functional silicone oligomer was prepared by the equilibration of a mixture of 519.0 g (7.00 equivalents of $(CH_3)_2SiO$) of octamethylcyclotetrasiloxane, 328.5 g (5.07 equivalents of $CH_3HSiO$) of polyhydrogenmethyl siloxane, available from Dow Corning under the trade designation DC 1107™, and 15.72 g (0.0968 moles) of hexamethyldisiloxane. This mixture was shaken with 0.86 g of concentrated sulfuric acid and 4.36 g of activated carbon black overnight. The mixture was then filtered and volatiles were removed under high vacuum (0.1 mm Hg) at 200° C. The resulting product was a clear, colorless liquid with a measured Si—H equivalent weight of 161 grams/equivalent.

In a 3-liter, 3-neck flask equipped with a condenser, mechanical stirrer, thermometer, addition funnel, and rubber septum, 695 g of the silicone oligomer (4.32 equivalents of $CH_3HSiO$) were dissolved in 1280 g of hexane, and heated to 60° C. in a nitrogen atmosphere. Into the addition funnel was placed 342.8 grams (3.29 moles) of styrene which was discharged into the flask over a 30 minute period. At the same time, a solution of 0.1410 g of 15% platinum in divinyltetramethyldisiloxane in 4 ml hexane was pumped with a syringe through the rubber septum at a rate of 1.5 ml/hr. On addition of the catalyst solution, the temperature rose to about 70° C. and the reaction was maintained at about that temperature. After 1.5 hours, 50.6 g (0,407 mole) of 4-vinylcyclohexene oxide (VCHO), available from Union Carbide Corp., was added in one portion and stirred. After 2 more hours, 193.7 g (1.70 moles) of allyl glycidyl ether (AGE), available from Aldrich Chemical Co., was added along with 2 drops of 15% platinum in divinyl tetramethyldisiloxane. After 1.5 hours, infrared analysis indicated complete consumption of the Si-H bonds, and the volatiles were removed from the reaction under reduced pressure followed by high vacuum. The resulting epoxystyrylsilicone was a clear straw-colored liquid having a measured epoxy equivalent weight (EEW) of 1158 grams/equivalent.

A release composition was prepared by mixing 95 parts of epoxystyrylsilicone, 2 parts bis(dodecylphenyl)iodonium hexafluoroantimonate, 3 parts dodecanol, and 0.2 parts 2-isopropylthioxanthone. A pressure sensitive adhesive tape backing was prepared by coating the release composition to a thickness of about 0.5 micron onto the corona treated side of a 0.04 mm thick biaxially oriented polypropylene film using an offset gravure coating head, and curing under a medium pressure ultraviolet lamp until a tackfree coating was obtained. The coating is defined to be tackfree when it does not detackify a 2.54 cm wide strip of Scotch$^R$610 tape firmly pressed onto the coating within 15 seconds after curing. The total radiation dose was about 100 mJ/cm$^2$.

Release Compositions R2–R6

The ratios of the three siloxane starting materials used in the process described under Release Composition I were changed to provide various hydride functional silicone oligomers. These oligomers were then used to prepare epoxysilicones of the general formula

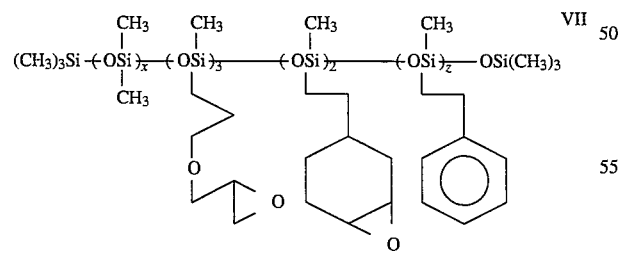

having x, y, and z as shown in Table I below. The value for y is the total number of siloxane groups having epoxy functionality and was maintained at 5 for these compositions. The ratio of the aliphatic to cycloaliphatic epoxy groups was 3:2 as shown in Formula VII. The epoxystyrylsilicones have an average of 50 monomer units. Release compositions were prepared according to the procedure described above.

Release Composition R7

A release composition was prepared as described above using an epoxysilicone having the following general formula:

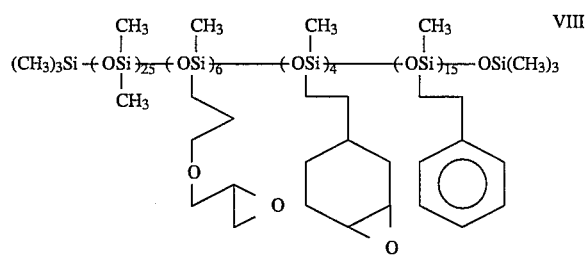

Release Composition R8

A release composition was prepared by mixing 95 parts of the epoxysilicone in release composition R3 with 5 parts "DER 732" an epoxy resin available from Dow Chemical Company, and adding the catalysts described in Release Composition I.

Release Compositions R9–R12

Release compositions were prepared according to the above procedure for epoxysilicones having the general formula for Release Composition R3, except that the ratios of cycloaliphatic epoxy groups (formed from VCHO) to aliphatic epoxy groups (formed from AGE) were varied as shown in Table II. The average number of epoxy groups (y) was 5 for all of the epoxysilicones. The average value for x was 33 and the average value for z was 12.

Release Compositions R13–R15

Release compositions were prepared as described above using epoxypolysiloxanes of the general formula

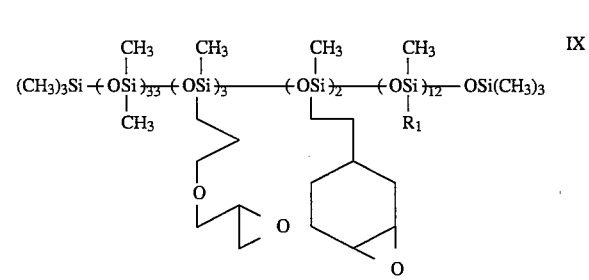

The R$^1$ group was formed from the various compounds as shown in Table III.

Adhesive A

A pressure sensitive adhesive was prepared by feeding 100 parts of a three-arm styrene-isoprenestyrene radial block copolymer designated as "RP" into the feed section of a co-rotating twin screw extruder. The copolymer had a styrene content of about 20% and a molecular weight of about 200,000, and includes about 11% styrene-isoprene diblock. The copolymer can be prepared as disclosed in U.S. Pat. No. 5,194,500, incorporated herein by reference. Tackifying resins (Escorez™ 1310 available from Exxon Chemical Company, and Zonarez™ A25 available from Arizona Chemical Co.) were converted to molten form in a melt pot and pumped by means of a metering pump to one or more of the auxiliary ports in the extruder barrel at rate of 90 parts of Escorez 1310™ per hundred parts of copolymer and 10 parts of Zonarez™A25 per hundred parts of copolymer. Also added to the resin in the melt pot were 1.5 parts of 3,3'-dilaurylthiodipropionate and 1.5 parts of octadecyl-3,5-di-tert-butyl-4-hydroxyhydrocinnamte, both per hundred parts of copolymer. The adhesive was hot melt coated onto a backing that was prepared as described in Release Composition I. The coating weight was about 460 milligrams/200 cm² (mg/200 cm²). The adhesive had a storage modulus (G') of $1.7 \times 10^6$ dynes/cm² as measured according to the above-described test procedure.

Adhesives B—H

Adhesives B—G were prepared according to the procedure described for Adhesive A except that various types of block copolymers were used with various types and amounts of tackifiers as follows:

Adhesive B was prepared using 100 parts by weight of "RP", 90 parts by weight of Escorez™1310, and 20 parts by weight of Zonarez™ A25. The adhesive had a storage modulus (G') of $1.7 \times 10^6$ dynes/cm².

Adhesive C was prepared using 100 parts by weight of Kraton™1107 (available from Shell Chemical Company) and 100 parts by weight of Wingtack Plus™. The adhesive had a storage modulus (G') of $1.6 \times 10^6$ dynes/cm².

Adhesive D was prepared using 100 parts by weight of Vector-4100™ (available from Dexco Polymers), 110 parts by weight of Escorez™ 1310, and 12 parts by weight of Shellflex™371 (available from Shell Chemical Company). The adhesive had a storage modulus (G') of $9.1 \times 10^5$ dynes/cm².

Adhesive E was prepared using 100 parts by weight of RP-6408 ™, 100 parts by weight of Escorez™ 1310, and 6 parts by weight of Shellflex™ 371. The adhesive had a storage modulus (G') of $1.2 \times 10^6$ dynes/cm².

Adhesive F was prepared using 100 parts by weight of Vector™ 4100, 100 parts by weight of Escorez™ 1310, and 6 parts by weight of Shellflex™371. The adhesive had a storage modulus (G') of $1.1 \times 10^6$ dynes/cm².

Adhesive G was prepared using 100 parts by weight of Kraton™1107 and 100 parts by weight of Escorez™1310. The adhesive had a storage modulus (G') of $1.3 \times 10^6$ dynes/cm².

Adhesive H was a solvent based adhesive made by mixing 100 parts of Kraton™1101 (available from Shell Chemical Co.), 76 parts Piccolyte 135 resin and 0.75 parts of Cab-o-Sil™M-5 (silica available from Cabot Corp.) in 276 parts of toluene until a solution was formed (about 10 hours.) The adhesive was knife coated onto a release coated backing and dried in an oven to remove the solvent.

Examples 1–25

Pressure sensitive adhesive tapes were prepared using various of Release Compositions R1–R7 and various of Adhesives A, B, C, D, E, and F as shown in Table I. The Release Compositions and Adhesives were coated out onto backings as described above except as otherwise indicated in Table I. The tapes were tested for unwind force and noise level according to the tests described above and results are shown in Table I below.

Comparative Example C1

Comparative Example C1 was a well accepted box sealing tape #375 clear Box Sealing Tape available from Minnesota Mining & Manufacturing Company.

TABLE I

| Ex | Comp | Epoxysilicone x | y | z | Adhesive | Unwind Force N/dm Init | Aged | Noise Level dB |
|---|---|---|---|---|---|---|---|---|
| 1 | R1 | 29 | 5 | 16 | A | 7 | 7 | 63 |
| 2 | R2 | 25 | 5 | 20 | A | 11 | 16 | 74 |
| 3 | R3 | 33 | 5 | 12 | A | 7 | 5 | 65 |
| 4 | R4 | 35 | 5 | 10 | A | 7 | 13 | 70 |
| 5 | R5 | 38 | 5 | 7 | A | 4 | 4 | 66 |
| 6 | R2* | 25 | 5 | 20 | A | 18 | 26 | 85 |
| 7 | R7* | 25 | 10 | 15 | A | 19 | 27 | 100 |
| 8 | R2 | 25 | 5 | 20 | B | 12 | 18 | 72 |
| 9 | R3 | 33 | 5 | 12 | B | 7 | 9 | 66 |
| 10 | R5 | 38 | 5 | 7 | B | 4 | 4 | 69 |
| 11 | R2 | 25 | 5 | 20 | C | 25 | 37 | 103 |
| 12 | R1 | 29 | 5 | 16 | C | 23 | 28 | 83 |
| 13 | R4 | 35 | 5 | 10 | C | 19 | 18 | 73 |
| 14 | R6 | 43 | 5 | 2 | C | 9 | 9 | 64 |
| 15 | R4 | 35 | 5 | 10 | C** | 32 | 27 | 102 |
| 16 | R5 | 38 | 5 | 7 | C** | 28 | 22 | 66 |
| 17 | R8 | 33 | 5 | 12 | C** | 16 | 19 | 68 |
| 18 | R1 | 29 | 5 | 16 | D | 18 | 22 | 64 |
| 19 | R3 | 33 | 5 | 12 | D | 12 | 20 | 59 |
| 20 | R1 | 29 | 5 | 16 | E+ | 9 | 9 | 73 |
| 21 | R3 | 33 | 5 | 12 | E+ | 7 | 7 | 68 |
| 22 | R5 | 38 | 5 | 7 | E+ | 2 | 2 | 74 |
| 23 | R1 | 29 | 5 | 16 | F+ | 13 | 13 | 77 |
| 24 | R3 | 33 | 5 | 12 | F+ | 11 | 11 | 75 |
| 25 | R5 | 38 | 5 | 7 | F+ | 3 | 3 | 77 |
| C1 | — | — | — | — | — | 9 | 9 | 98 |

*Coated onto 0.05 mm thick biaxially oriented polypropylene film
**Coated with adhesive weight of 670 mg/200 cm² on 0.05 mm thick biaxially oriented polypropylene film
+Coated with adhesive weight of 544 mg/200 cm² on 0.05 mm thick biaxially oriented polypropylene film The data in Table I show that various epoxypolysiloxanes are useful for making low noise unwind tapes with various hot melt adhesive compositions as compared to a commercially acceptable box sealing tape. The epoxypolysiloxanes can be modified as shown in the table to provide the desired release level and acceptable noise level for a specific adhesive composition.

Examples 26–37

Pressure sensitive adhesive tapes were prepared as in Example 1 except using Release Compositions R9–R12 having various ratios of AGE to VCHO as the epoxy moieties, and various Adhesives E, F, and G as shown in Table II. Test data are also shown in Table II.

TABLE II

| Ex | Comp | AGE/VCHO Ratio | Adhesive Type | Unwind Force N/dm Init | Aged | Noise Level dB |
|---|---|---|---|---|---|---|
| 26 | R9 | 0:5 | E | 9 | 9 | 86 |
| 27 | R10 | 1:4 | E | 7 | 7 | 82 |
| 28 | R11 | 2:3 | E | 7 | 7 | 74 |
| 29 | R12 | 3:2 | E | 7 | 7 | 74 |
| 30 | R9 | 0:5 | F | 14 | 19 | 98 |
| 31 | R10 | 1:4 | F | 11 | 15 | 72 |
| 32 | R11 | 2:3 | F | 9 | 15 | 80 |
| 33 | R12 | 3:2 | F | 11 | 13 | 70 |
| 34 | R9 | 0:5 | G | 15 | 24 | 73 |

TABLE II-continued

| Ex | Comp | AGE/VCHO Ratio | Adhesive Type | Unwind Force N/dm Init | Aged | Noise Level dB |
|---|---|---|---|---|---|---|
| 35 | R10 | 1:4 | G | 12 | 20 | 72 |
| 36 | R11 | 2:3 | G | 12 | 14 | 70 |
| 37 | R12 | 3:2 | G | 13 | 15 | 74 |

The data in Table II show that the ratios of the aliphatic epoxy groups to the cycloaliphatic groups can be varied to make useful low noise unwind pressure sensitive adhesive tapes.

Examples 38–47

Pressure sensitive adhesive tapes were prepared using various of the Release Compositions R13–R15 and various of the Adhesives A, D, and G as shown in Table III. Example 47 was prepared on 2.5 mil (0.06 mm) "Rhiliner Bleached Backing" paper available from Rhinelander Paper Co. The tapes were tested for unwind and noise level as described above.

TABLE III

| Ex | Comp | Starting Compound to form R¹ group | Adhesive Type | Unwind Force N/dm Init | Aged | Noise level dB |
|---|---|---|---|---|---|---|
| 38 | R13 | Allylphenyl ether | G | 24 | 22 | 66 |
| 39 | R13 | Allylphenyl ether | A | 13 | 11 | 66 |
| 40 | R13 | Allylphenyl ether | D | 19 | 20 | 62 |
| 41 | R14 | Allylbenzene | G | 20 | 23 | 67 |
| 42 | R14 | Allylbenzene | A | 8 | 7 | 78 |
| 43 | R14 | Allylbenzene | D | 13 | 13 | 64 |
| 44 | R15 | Ethyl Undecenoate | G | 27 | 24 | 87 |
| 45 | R15 | Ethyl Undecenoate | A | 9 | 12 | 73 |
| 46 | R15 | Ethyl Undecenoate | D | 13 | 21 | 63 |
| 47 | R15 | Ethyl Undecenoate | D | 3 | 5 | 71 |

The data in Table III show the utility of other substituent groups that are not reactive with the epoxy groups in making epoxysilicones for pressure sensitive adhesive tapes with low noise unwind and controlled release.

Example 48

A pressure sensitive adhesive tape was prepared using adhesive H coated onto a biaxially oriented polypropylene film backing. The coated tape was then laminated onto a film having release composition R3, prepared as in Example 1. The tape was pulled away from the release coating at about 20 meters/minute and the noise level was estimated to be below about 80 dB.

What is claimed is:

1. A composite structure comprising i) a first substrate bearing on at least a portion of a major surface thereof a first layer comprising the reaction product of a starting material comprising an epoxypolysiloxane of the formula I:

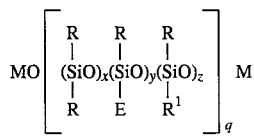

wherein R is a lower alkyl group having one to three carbon atoms;

R¹ is branched or cyclic alkyl; aryl; straight, branched or cyclic alkylaryl; or straight, branched or cyclic aralkyl; contains four up to about 50 carbon atoms; and may be optionally substituted by one or more functional groups, but is substantially free of any functional group which increases crosslinking of the epoxypolysiloxane through reaction with the epoxy functionality;

E is a monovalent epoxy functional group which can be linear aliphatic, branched aliphatic, cycloaliphatic, or a mixture thereof;

M is a silyl group selected from $R_3Si\text{---}$, $R_2R^1Si\text{---}$, $RR^1_2Si\text{---}$, $R^1_3Si\text{---}$, $R_2ESi\text{---}$, $RE_2Si\text{---}$, $E_3Si\text{---}$, $R^1_2ESi$, $R^1E_2Si\text{---}$, and $RR^1ESi\text{---}$, in which R, $R^1$, and E are defined above;

x is zero or a number having a value up to about 200;
y is zero or a number having a value up to about 40;
z is one or a number having a value up to about 200 −x; and
q is a number having a value of 1 to about 75; with the proviso that the epoxypolysiloxane contains at least one E group, but less than about 20% of the total number of siloxane groups are substituted with E;

the first layer being cured in the presence of a catalytically effective amount of a cationic curing catalyst; and ii) a second substrate bearing on at least a portion of a major surface thereof a second layer comprising a pressure-sensitive adhesive having a storage modulus when measured in torsional shear at 25° C. and 100 radians/second of at least about $6 \times 10^5$ dynes/cm², the second substrate being attached to the surface of the first layer opposite the first substrate by means of the pressure-sensitive adhesive.

2. A composite structure according to claim 1, wherein the epoxypolysiloxane is of the formula $$MO\begin{bmatrix} R & R & R & R \\ | & | & | & | \\ (SiO)_x(SiO)_z(SiO)_t(SiO)_s \\ | & | & | & | \\ R & R^1 & G & J \end{bmatrix}_q M \quad V$$

wherein
R is a lower alkyl group having one to three carbon atoms,
R¹ is as defined in claim 1 above;
J is a monovalent linear or branched aliphatic epoxy group;
G is a monovalent cycloaliphatic epoxy group;
M is a silyl group selected from $R_3Si\text{---}$, $R_2R^1Si\text{---}$, $RR^1_2Si\text{---}$, $R^1_3Si\text{---}$, $R_2JSi\text{---}$, $RJ_2Si\text{---}$, $J_3Si\text{---}$, $R^1_2Si\text{---}$, $R^1J_2Si\text{---}$, $RR^1JSi\text{---}$, $R_2GSi$, $RG_2Si\text{---}$, $G_3Si\text{---}$, $R^1_2GSi\text{---}$, $R^1G_2Si\text{---}$, $RR^1GSi\text{---}$, $RJGSi\text{---}$, $J_2GSi\text{---}$, $G_2JSi\text{---}$, and $R^1JGSi\text{---}$, in which R, ¹, J and G are defined above;
x is zero or a number having a value of up to about 200;
z is a number having a value of 1 to about 200−x;
s is zero or a number having a value of up to about 40;
t is zero or a number having a value of up to about 40; and
q is a number having a value of 1 to about 75; with the proviso that said epoxypolysiloxane comprises at least one G group and one J group, the ratio of G to J groups is from about 1:10 to 2:1, and the total number of J and G groups is less than about 20% of the total number of siloxane units.

3. A composite structure according to claim 1, wherein the pressure-sensitive adhesive has a storage modulus of at least about $8 \times 10^5$ dynes/cm².

4. A composite structure according to claim 1, wherein the pressure-sensitive adhesive has a storage modulus of at least about $1 \times 10^6$ dynes/cm².

5. A composite structure according to claim 1, wherein the pressure-sensitive adhesive is a synthetic block copolymer adhesive.

6. A composite structure according to claim 1, wherein the pressure-sensitive adhesive is a natural rubber adhesive.

7. A composite structure according to claim 1, wherein the pressure-sensitive adhesive is an acrylate copolymer adhesive.

8. A composite structure according to claim 1 in the form of a tape.

9. A composite structure according to claim 8, wherein the tape is convolutely wound in a roll.

10. A composite structure according to claim 1, wherein the first and second substrates are the same component.

* * * * *

UNITED STATES PATENT AND TRADEMARK OFFICE
CERTIFICATE OF CORRECTION

PATENT NO. : 5,460,863
DATED : October 24, 1995
INVENTOR(S) : Carl R. Kessel, Robert G. Lockwood, Tracy R. Woodward, and Maan-shii S. Wu It is certified that error appears in the above-indentified patent and that said Letters Patent is hereby corrected as shown below:

Column 5, line 14, delete "-," after "$RR^1_2Si-,$".

Column 5, line 14, delete "$RJSi-,$" and substitute with --$RJ_2Si-,$--.

Column 5, line 15, delete "$RGSi-,$" and substitute with --$RG_2Si-,$--.

Column 14, line 50, after "R," and before "$^1$," insert --R--.

Signed and Sealed this

Twenty-fifth Day of June, 1996

Attest:

BRUCE LEHMAN

*Attesting Officer*  *Commissioner of Patents and Trademarks*